(12) United States Patent
Alfawaz et al.

(10) Patent No.: US 9,648,810 B2
(45) Date of Patent: May 16, 2017

(54) IRRIGATION SYSTEMS AND METHODS (71) Applicant: HYDRAMISER, LLC, Covina, CA (US)

(72) Inventors: Abdullah Alfawaz, Anaheim, CA (US); Ayman Abdel Nour, Covina, CA (US)

(73) Assignee: Hydramiser, LLC, Covina, CA (US)

( * ) Notice: Subject to any disclaimer, the term of this patent is extended or adjusted under 35 U.S.C. 154(b) by 126 days.

(21) Appl. No.: 14/561,108

(22) Filed: Dec. 4, 2014

(65) Prior Publication Data
US 2016/0066523 A1 Mar. 10, 2016

Related U.S. Application Data (60) Provisional application No. 62/085,154, filed on Nov. 26, 2014, provisional application No. 62/046,785, filed on Sep. 5, 2014.

(51) Int. Cl.
*A01G 27/00* (2006.01)
*A01G 29/00* (2006.01)

(52) U.S. Cl.
CPC ........... *A01G 27/006* (2013.01); *A01G 27/00* (2013.01); *A01G 29/00* (2013.01)

(58) Field of Classification Search
CPC ...... A01G 27/00; A01G 27/006; A01G 27/02; A01G 29/00
USPC .............................. 47/79, 80, 48.5
See application file for complete search history.

(56) References Cited

U.S. PATENT DOCUMENTS

| | | | | |
|---|---|---|---|---|
| 419,242 | A | * 1/1890 | Brown | A01G 29/00 405/39 |
| 2,791,347 | A | 5/1957 | Boehm | |
| 4,726,143 | A | * 2/1988 | Steinbeck | A01G 29/00 47/48.5 |
| 5,761,846 | A | * 6/1998 | Marz | A01G 25/06 47/48.5 |
| 6,540,436 | B2 | * 4/2003 | Ogi | A01G 29/00 239/201 |
| 7,862,254 | B2 | * 1/2011 | Jin Hyun | A01G 27/005 405/39 |

(Continued)

FOREIGN PATENT DOCUMENTS

FR 2654301 5/1991
WO WO 2006/112802 10/2006

OTHER PUBLICATIONS

PCT Application No. PCT/US2015/048404 International Search Report and Written Opinion Mailed Dec. 23, 2015, in 17 pages.

*Primary Examiner* — Lisa Tsang
(74) *Attorney, Agent, or Firm* — Knobbe Martens Olson & Bear LLP (57) ABSTRACT

An irrigation device and related methods involve the device having a container defining an interior space. The container has a perforated side wall portion, a solid top wall portion and a solid bottom wall portion such that water is dispensed from the device through the perforated side wall portion. An elongated neck has a first end and a second end and defines a conduit therebetween. The second end of the neck is coupled to the container and the neck extends upwardly from the container to the first end. A water inlet communicates with the conduit of the neck at the first end. In use, the container is buried underground and the water is delivered to the container through the water inlet and conduit of the neck.

11 Claims, 8 Drawing Sheets (56) References Cited

U.S. PATENT DOCUMENTS

| | | | |
|---|---|---|---|
| 8,371,065 B2* | 2/2013 | Peterson | A01G 29/00 47/48.5 |
| 2002/0134011 A1* | 9/2002 | Astle | A01G 27/00 47/48.5 |
| 2005/0039395 A1* | 2/2005 | Schwartz | A01G 29/00 47/47 |
| 2006/0112626 A1* | 6/2006 | Liu | A01G 25/06 47/48.5 |
| 2008/0163547 A1* | 7/2008 | Sade | A01G 27/00 47/66.6 |
| 2011/0056128 A1* | 3/2011 | King | A01G 29/00 47/48.5 |
| 2013/0219786 A1* | 8/2013 | Geerligs | A01G 29/00 47/48.5 |

* cited by examiner

IRRIGATION SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND

Field

The present disclosure relates to irrigation systems and methods. In particular, the present disclosure relates to an underground irrigation device and related methods.

Description of the Related Art

Many types of irrigation systems currently exist. Many of such systems rely on nozzles to distribute water in the form of a spray. These spray systems are inefficient in that they subject the distributed water to evaporation prior to being absorbed into the ground. Other systems utilize conduits to deliver water to a location near a plant base thereby reducing the total water use and the loss to evaporation. Such systems are often referred to as drip irrigation systems. However, drip systems typically deliver water to an above-ground location, which may be sufficient for small plants and flowers with roots close to the ground surface, but may be less effective with larger plants or trees.

PCT Publication No. WO 2006/112802 discloses an irrigation system comprising an irrigation device that is buried underground near the root of a large plant or tree. The device includes a perforated container that can be filled with a granular material to inhibit or prevent ingrowth of roots or entry of soil into the perforated container. The underground device is connected to a source of water and water is supplied through a suitable conduit to the perforated container. The water exits the container at a location near the root of the large plant or tree to improve the availability and utilization of the supplied water. With such a system, water usage can be reduced compared to conventional irrigation systems.

SUMMARY

An aspect of the present invention involves the realization by the present inventor that the system of the WO 2006/112802 publication has several drawbacks and there exists room for improvement. For example, the container of the WO 2006/112802 publication is generally spherical and includes perforations on a substantial portion of the surface area of the container, including top, side and bottom surfaces. As a result, water can be dispensed in substantially all directions from the container, which can result in inefficient utilization of the water. One or more of the configurations disclose herein address the foregoing and/or other drawbacks of the WO 2006/112802 device. The systems, methods and devices described herein have innovative aspects, no single one of which is indispensable or solely responsible for their desirable attributes. Without limiting the scope of the claims, some of the advantageous features will now be summarized.

In some configurations, an irrigation device comprises a container defining an interior space. The container comprises a perforated side wall portion, a solid top wall portion and a solid bottom wall portion such that water is dispensed from the device through the perforated side wall portion. An elongated neck has a first end and a second end and defines a conduit therebetween. The second end is coupled to the container and the neck extends upwardly from the container to the first end. A water inlet communicates with the conduit of the neck at the first end. In use, the container is buried underground and the water is delivered to the container through the water inlet and conduit of the neck.

In some configurations, the bottom wall portion of the container further comprises a solid core that extends upwardly and cooperates with the side wall portion to define an annular portion of the interior space of the container.

In some configurations, the side wall portion is outwardly tapered and a wall of the core is inwardly tapered in a direction from bottom to top of the container.

In some configurations, the container comprises a basket and a lid, wherein the basket defines the bottom wall portion and the side wall portion and the lid defines the top wall portion, further comprising a divider positioned between the basket and the lid, the divider comprising a perforated portion.

In some configurations, the perforated portion of the divider is annular in shape.

In some configurations, the neck comprises multiple neck segments that are connectable to one another.

In some configurations, a cap is attached to the first end of the neck, wherein the cap defines the water inlet.

In some configurations, a flow regulator is provided in the cap.

In some configurations, the flow regulator is adjustable up to 300 liters/hour.

In some configurations, the flow regulator comprises one or more tortuous pathways through which water flows within the flow regulator.

In some configurations, the perforations of the perforated side wall portion of the container have dimensions of between 1 and 15 mm.

In some configurations, the container is between 15-50 cm in height and between 15-50 cm in width.

In some configurations, the container is generally spherical in outer shape.

In some configurations, a granular material is placed within the container.

In some configurations, a method of irrigation comprises burying an irrigation device comprising a container and a neck with the neck extending upwardly from the container. The container defines an interior space, a perforated side wall portion, a solid top wall portion and a solid bottom wall portion. The neck defines a conduit in fluid communication with the interior space of the container. A source of water is connected to a water inlet that communicates with the conduit of the neck. Water is supplied to the device so that water is dispensed in a radial direction through the perforated side wall portion.

In some configurations, the container is buried 10-100 cm under a surface of the ground.

In some configurations, the container is buried at least 40 cm under a surface of the ground.

In some configurations, the water inlet is positioned above a surface of the ground.

In some configurations, the water inlet is positioned at least 25 cm below a surface of the ground.

In some configurations, a granular material is provided in the interior space of container.

In some configurations, a divider is provided between the granular material and the neck.

In some configurations, a hollow jar with a semi spherical lower bulb and a neck is used to irrigate trees and is buried underground at a depth of about 10-100 cm in proximity to the roots of trees in order to transfer water to the roots directly without passing water over the surface of the earth.

In some configurations, the jar can take different shapes, such as conic or semi-conic, cube or semi-cube, spherical or semi-spherical, cylindrical or semi-cylindrical and pyramid or semi-pyramid.

In some configurations, the jar is made of plastic or plated metals unable or resistant to rust.

In some configurations, the jar carries water, fertilizers, pesticides, ferrous powder or any other material with the water to be absorbed by the roots of trees.

In some configurations, wherein the jar is 15-50 cm long and 10-50 cm in diameter and whose bulb has perforations of 1 mm-15 mm.

In some configurations, the jar facilitates planting trees in mountainous, sloppy land without being reclaimed or cleared.

In some configurations, the semi-spherical bulb has perforations of 1 mm-15 mm and is hollow to make it lighter and stronger.

In some configurations, the jar has a cap with a flow regulator, a neck and a perforated bulb.

In some configurations, the bulb is made of two or more separable pieces to facilitate maintenance. In some configurations, the bulb is made of three pieces. In particular, a bulb cap, a hollow basket and a divider.

In some configurations, the lower bulb is filled with a blend of charcoal and volcanic granules to support the jar and to enhance its mechanical ruggedness especially against external pressure and to prevent roots from getting into the bottle and blocking the perforations.

In some configurations, there is a perforated circular divider inside the bulb to make it strong and to press on the blend of granules in the bulb to fix it and to prevent it from floating up in the neck.

In some configurations, the water comes from a branch hose or tube, passes into the water inlet, passes through a variable flow regulator which is a conical head fixed on a moveable base that can move, for example, by the movement of a gear so that it can control the amount of water needed to the roots. In one configuration, when the conical head advances, the water passage increases resistance to the flow of water and water flows in smaller amounts and, when the conical head retracts, it allows more water to flow into the jar.

In some configurations, the water comes from a branch hose or tube, passes into the water inlet, passes through a constant flow regulator which has a constant hydraulic resistance manufactured to provide any desired value between 0.1 to 300 liter/hour or more.

In some configurations, the water comes from a branch hose or tube, passes into the water inlet across a filter, and the water leaves the flow regulator across another filter.

In some configurations, the jar has a long neck, 20 to 40 cm or more as desired.

In some configurations, the lower bulb is buried under ground in proximity to the roots of the trees and whose neck remains above ground so that its cap is exposed.

In some configurations, variable flow regulator can be controlled easily by lifting the upper cap of the jar above ground and by moving the base on which the conical head is fixed to calibrate the amount of water provided. The cap, being above the ground, helps to easily control the flow of water.

In some configurations, the jar is buried completely underground in proximity to the roots of trees and at a depth of 40 cm or more.

In some configurations, the jar need not be removed before plowing the earth because the plow goes about 25 cm deep underground, while the jar is buried 25 cm-40 cm or more underground.

In some configurations, an irrigation device comprises a generally conical container defining an interior space. The container comprises one or more outlets such that water is dispensed from the device. An elongated neck has a first end and a second end and defines a conduit therebetween. The second end is coupled to the container and the neck extends upwardly from the container to the first end. A water inlet communicates with the conduit of the neck at the first end. A flow regulator between the water inlet and the container defines one or more tortuous pathways through which water flows. In use, the container is buried underground and the water is delivered to the container through the water inlet and conduit of the neck.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Embodiments of systems, components or methods of assembly or manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Many parts of the world are badly in need of water. This rising demand on water unfortunately can be impacted by drought and decreasing levels of water in the aquifers. Shortage of water has resulted in many approaches to make the best use of this vital resource. Irrigation by dripping or by sprayers helped increased the areas planted with vegetables and young trees. However, the roots of old trees often expand horizontally underground because of using old ways of irrigation for many years. Such trees often stopped growing providing fruits because their roots had dried. In addition, old methods of irrigation caused weeds to grow and resulted in large amounts of evaporation Therefore, a need exists for an improved system of irrigation that makes good use of the small amounts of water available and is able to save trees in the severe waves of drought. At least some of the embodiments or methods disclosed herein allow for irrigation of old trees, economizing of water, preventing evaporation and at the same time protecting trees from weeds, fungal diseases and pests. For example, by preventing humidity from spreading on the surface of the soil, the surface remains dry which, consequently, inhibits or prevents pests and fungal diseases from spreading and, at the same time, denies weeds the opportunity to grow.

In at least some configurations, the disclosure involves an irrigation system that irrigates trees easily and transfers fertilizers and nutrients directly to their roots. The system can permit trees to be planted in arid lands, in steep slopes and in rough terrain, because it carries water directly to the roots. The disclosed systems and methods partially or wholly negates the need for land reclamation, difficult labor and high costs.

At least some embodiments of the present disclosure involve a system configured to irrigate trees or other relatively large plants and to economize in water, fertilizers and pesticides. In some configurations, the system helps trees avoid gradual dryness caused by droughts and bad irrigation. At the same time, the system can help planting more trees in the same area, because it allows planting steep slopes without the need of earth leveling or of land reclamation.

In some configurations, buried jars receive water from a remote pump that pumps water through, in some cases, a filter to a network of pipes and then to the jars buried near the roots of the trees. To achieve this aim, water is pressurized and distributed in the soil at depths between about 10-120 cm without being exposed above the surface of the earth. Such an arrangement can reduce or eliminate evaporation after dispensing of water from the system.

In some configurations, the system is made of a plastic flask or container that is perforated on some or all sides and equipped with connections and caps containing a, for example, constant flow regulator. The container or jar can be hollow and filled with a granular material, such as volcanic basalt granules, in order to add strength to the jars and, at the same time, to inhibit or prevent roots from penetrating the holes around the jars. In some configurations, the jars can be buried between about 10 cm to 40 cm underground and connected with system of main and branch pipes which carry water to the jars through the constant flow regulators provided in the jar cap. Water leaks to the soil from the perforations in desired amounts without being exposed to the heat above ground and consequently it does not evaporate.

The system has many advantages, one or more of which include that it carries water directly to the roots of the trees in the required or desired amounts, which means saving water. In some configurations, the system can inhibit or prevent the growth of harmful weeds. In some configurations, the system can assist in inhibiting or preventing the spread of pests and fungal diseases. In some configurations, the system is designed for irrigating trees exclusively.

In some configurations, the system is made of plastic containers or jars that are hollow, generally spherical perforated bulbs about 20 cm in diameter and fitted with connection conduits that are about 25 cm long and about 5 cm in diameter. The jars can be closed with caps that have, for example, constant flow regulators inside them. The regulators receive water from a system or network of pipes connected to a pump that pumps water from the water source to a main pipe and then to the network of pipes. Preferably, the jars are filled with a granular material, such as volcanic basalt granules and charcoal. This filling is used to inhibit or prevent roots from infiltrating through the perforations in the jars and to mechanically or structurally protect the jars.

In some configurations, the jars are made of plastic. The plastic can be injected in molds prepared to cast the various parts that form the system. The various parts can be assembled together to make the flow regulator and the cap with, for example, two filters. The three parts of the bulb or jar can be assembled together and filled with the charcoal and volcanic granules, or another suitable granular material. The devices can be manufactured in a way that the length of the neck can be varied by adding connections or neck segment so that the devices can be configured with various lengths. The user can chose the neck segments to configure a neck of a suitable length according to the particular need.

In some configurations, the device includes three main parts, all of which can be made from a plastic material. The parts can include the jar, the neck and the cap. The cap can include a flow regulator. In some configurations, the jar is filled with a granular material, such as a mixture of volcanic basalt granules and charcoal, in order to increase the mechanical crush resistance of the jar and to inhibit or prevent roots from penetrating the perforations around the bulb so that they may not block water from flowing out of the device. However, other suitable reinforcements could also be used, such as a perforated reinforcement member or members. The jar can be hollow and can include hundreds to thousands of water exit holes around it to allow water to be distributed outside to the soil.

The jars can be positioned underground with the caps directed upwardly and above the surface of the ground. A relatively small water inlet (e.g., orifice valve) can be fixed in a small pipe connected with a hose or other conduit system provided along the rows of trees. Water runs through the hose to the pipe and then the water inlet in the jar cap to pass through the flow regulator. In some configurations, the regulator is a variable resistance regulator fixed within the flow path of the water to define the amount of water that should pass to the jar neck and then to the perforated bulb underground. Water leaks through the perforations to the soil to wet the area surrounding the roots of the tree and to supply it with the water and, if desired, fertilizers and nutrients.

In some cases, the devices are removed once per year in the season of plowing to avoid damage to the devices. At the same time, routine maintenance can be carried out on the devices.

With such a system, it is easy to calibrate the regulator and to control the flow of water systematically because the cap that contains the regulator is positioned above ground. With a constant flow regulator, there is no need to calibrate it and, as a result, such devices could have the cap buried. Fertilizers, ferrous salts, pesticides or other substances can easily be added by lifting the cap, adding these materials inside it, then capping it again. This saves the user from digging around the trees, which can lead to cutting parts of the roots.

In some configurations, the cap is made of five pieces assembled together. For example, the cap can include a cap element, a water inlet, a filter in the water inlet, a flow regulator, and a filter in the water outlet.

In some configurations, the jar can be buried completely (e.g., 40 cm) underground. Water can flow to the jars through a network of pipes, which can also be buried underground. This type of system allows the land to be plowed without removing the jars, because the depth of plowing rows is typically no more than 25 cm and therefore the plowshare would not reach the jars. Such a system can function for several years without being removed or maintained. In such systems, fertilizers, ferrous salts, pesticides and other substances can be dissolved in water and pumped through the pipes to the jars.

The short neck jar system can be used, also, to irrigate newly planted trees and rose trees. For this purpose, jars can be buried in pits about 20 cm deep and about 30-60 cm from the plants. In this case, the cap can remain above the ground. In general, the distance between trees and jars is usually defined in relation to the size and age of trees.

FIGS. 1-4 illustrate an irrigation device 100 that can form a portion of an irrigation system, such as the systems disclosed in PCT Publication No. WO 2006/112802, the entirety of which is hereby incorporated by reference herein and made a part of the present disclosure. As illustrated in the WO 2006/112802 publication, the device 100 can be buried underground at a location near the root of a tree or other relatively large plant. The device 100 typically is connected to a source of water. Multiple devices 100 can be linked together to one or more sources of water by a water distribution system. See, for example, FIGS. 5-9, 12 and 14 of the WO 2006/112802 publication. The overall system can be configured to automatically deliver water to the device(s) 100, such as by a timer-controlled valve, for example. However, in other arrangements, the supply of water can be manually controlled and, in some configurations, can involve stand-alone device(s) 100 that are manually supplied with water on a periodic basis. Other suitable methods of utilizing the device(s) 100 can also be employed.

Figure 1:
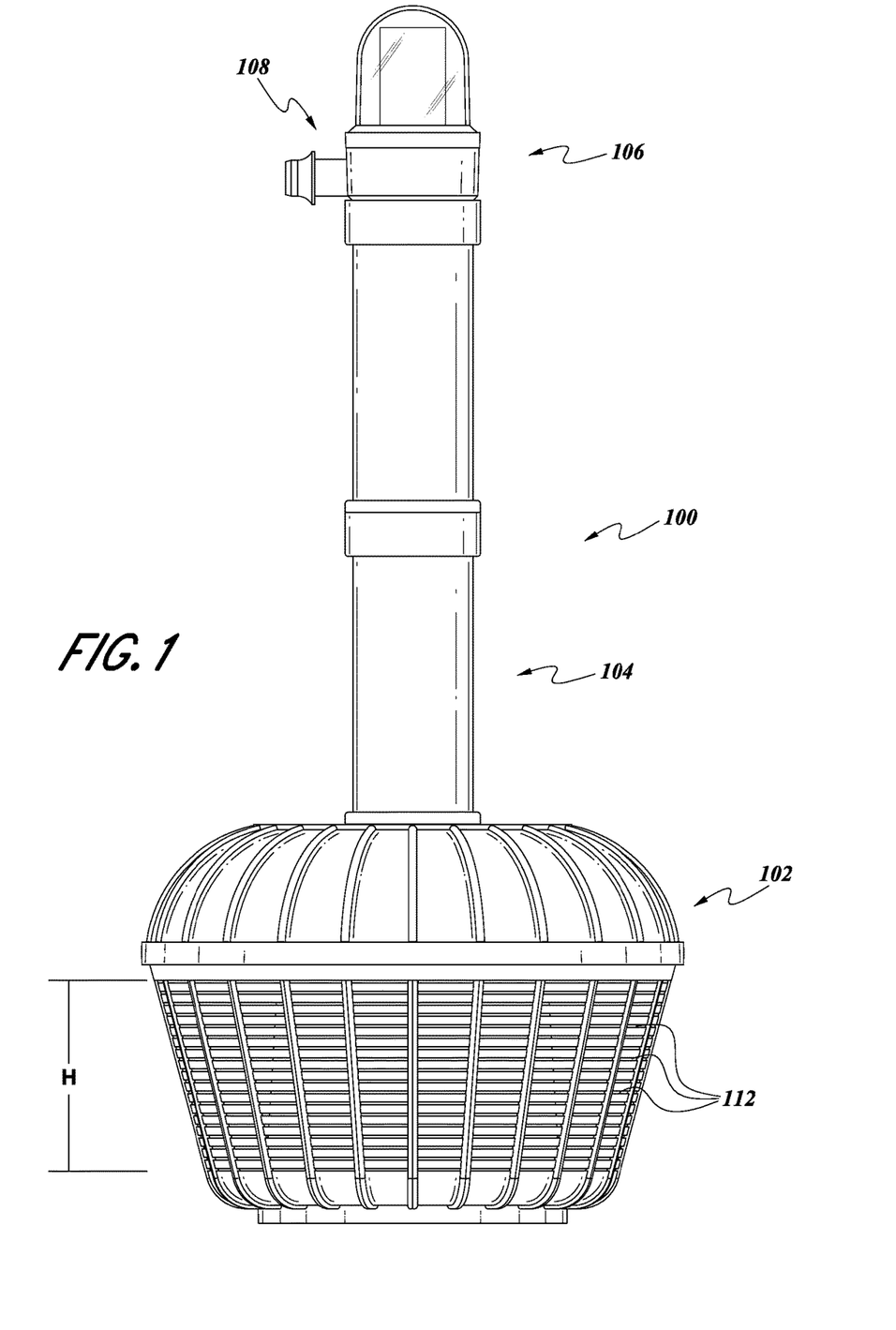
FIG. 1 is a side view of an underground irrigation device having certain features, aspects and advantages of a preferred embodiment. The device generally comprises a container, a neck extending upwardly from the container and a cap assembly at the top of the neck.
Figure 2:
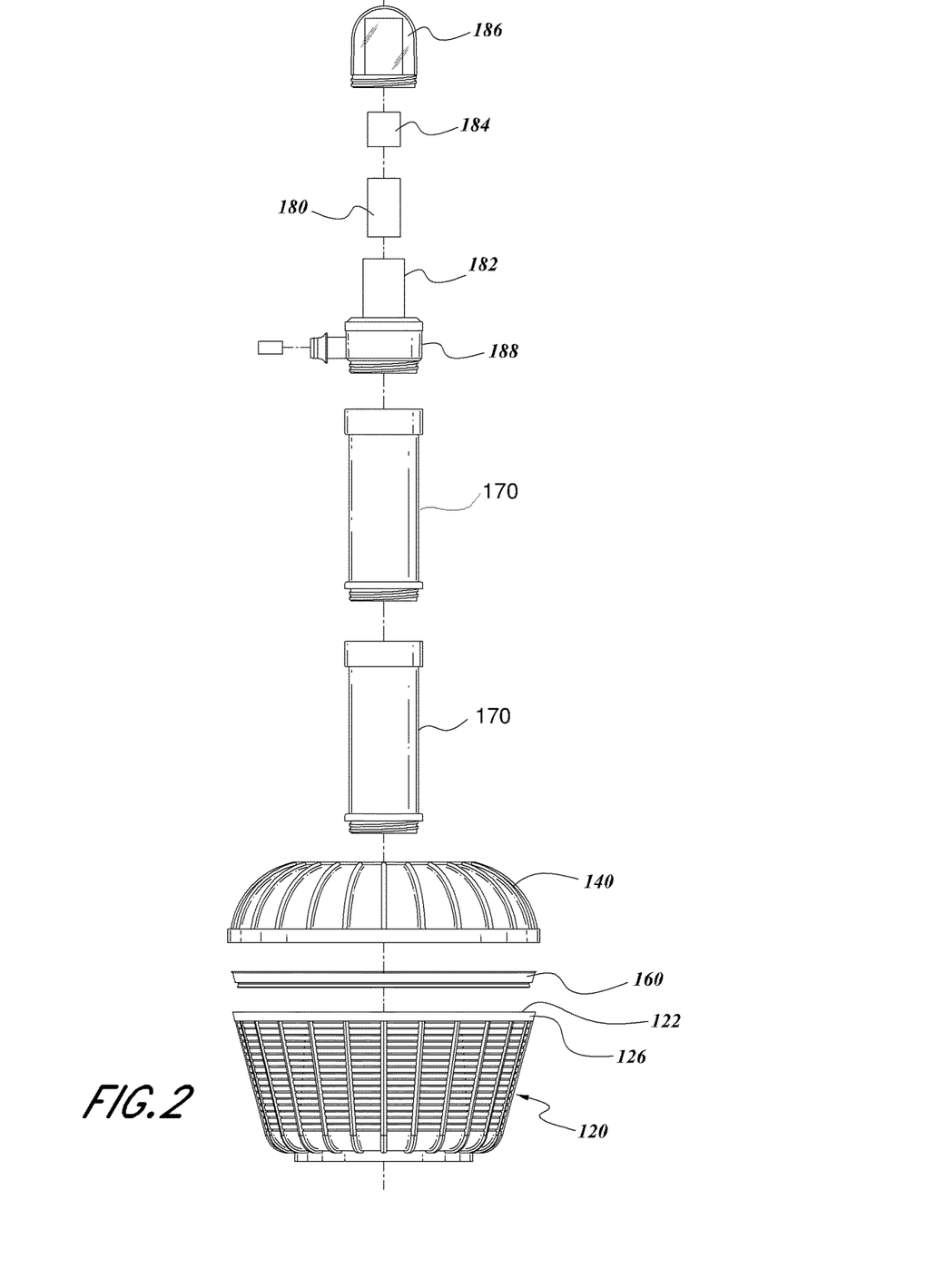
FIG. 2 is a side view of the device of FIG. 1 with components of the device illustrated in an exploded condition.
Figure 3:
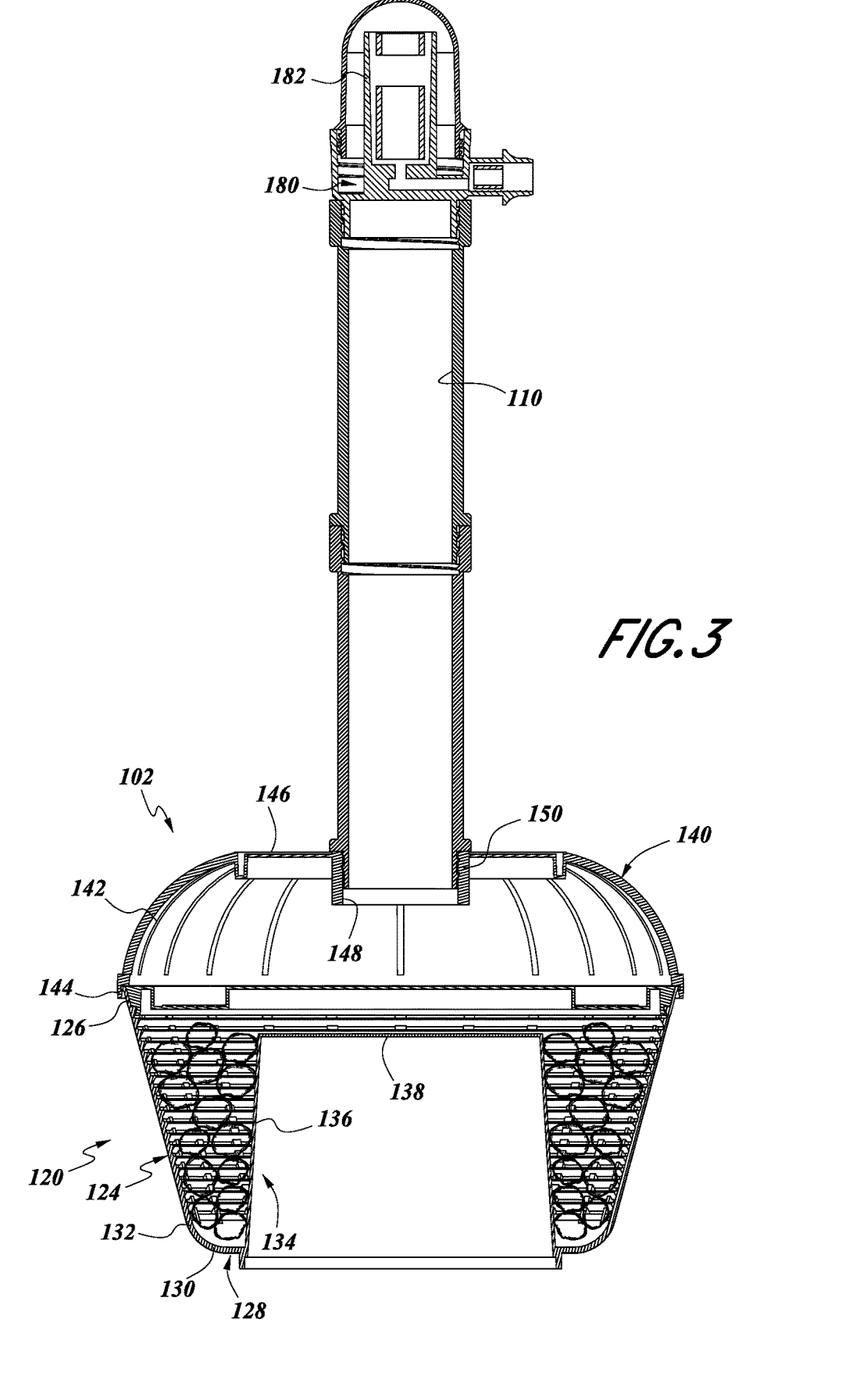
FIG. 3 is a side sectional view of the device of FIG. 1 taken along the line 3-3 of FIG. 1.

In general, the irrigation device 100 comprises a bulb or container 102, a neck 104 and a cap assembly 106. The neck 104 extends upwardly from the container 102. The cap 106 is located at an upper end of the neck 104. The cap 106 comprises a water inlet 108, which allows water from a water source (not shown) to enter the device 100. The water inlet 108 can be any suitable size, such as one-quarter inch or one-half inch, for example. The neck 104 defines a delivery conduit 110, which allows water to move from the inlet 108 of the cap 106 to the container 102. The container 102 includes a water outlet, which can be in the form of one or more openings 112 that permit water to exit the container 102 and be absorbed into the surrounding soil. In the illustrated arrangement, the container 102 includes a perforated section defining many water outlet openings 112.

In the illustrated arrangement, the container 102 comprises a basket 120 having an upper rim defining an open upper end 122. A side wall 124 of the basket 120 defines the water outlet openings 112. In other words, at least a portion of the side wall 124 is perforated. In the illustrated arrangement, a substantial entirety of the side wall 124 is perforated save for an upper rim 126 that provides the open upper end 122 with some strength and resistance to deformation. A lower portion of the side wall 124 may also omit water outlet openings 112, as further described below.

A bottom wall 128 of the container 102 can comprise an annular portion 130, which can be solid and cooperate with a solid portion 132 of the lower end of the side wall 124. The portions 130 and 132 can cooperate to define a toroidal shape. The bottom wall 128 can also comprise a solid center portion. In the illustrated arrangement, the solid center portion is in the form of an upwardly-projecting core 134 having a side wall 136 and a top wall 138. The side wall 136 is generally cylindrical and is closed at its upper end by the top wall 138.

Preferably, the side wall 136 of the core 134 has a height that is at least a substantial portion of a height of the outer side wall 124 of the basket 120. In some configurations, the side wall 136 of the core 134 has a height that is greater than one-half or greater than three-quarters of a height of the outer side wall 124 of the basket 120 as measured in a direction aligned with a longitudinal axis of the neck 104. In some configurations, the height of the side wall 136 of the core 134 is less than the height of the outer side wall 124 of the basket 120. The outer side wall 124 of the basket 120 and the side wall 136 of the core 134 cooperate to define an annular interior space within the basket 120. In the illustrated configuration, the outer side wall 124 is outwardly tapered from bottom to top and the side wall 136 of the core is inwardly tapered from bottom to top. The taper angle of the outer side wall 124 can be greater than the taper angle of the side wall 136 of the core 134.

In the illustrated arrangement, the container 102 also comprises a cap or lid 140. A side wall portion 142 of the lid 140 can be curved such that the lid 140 defines an internal volume. Thus, when the lid 140 is coupled to the basket 120, an internal volume of the container 102 is greater than the internal volume of the basket 120. The lid 140 can have an open lower end 144 that can be at least relatively securely coupled to the basket 120, such as by a snap-fit, screw-on (threaded) or other suitable arrangement. The lid 140 can include a relatively flat top wall portion 146 having an aperture or opening 148 configured to receive the neck 104. In some configurations, the neck 104 can be securely coupled to the lid 140, and thus the container 102, by a suitable coupling arrangement, such as a threaded or snap-fit arrangement. In the illustrated configuration, the neck 104 is coupled to the lid 140 by a threaded connection. The threaded portion of the lid 140 can be defined by a downwardly-extending or inwardly-extending boss 150 of the lid 140.

Figure 4:
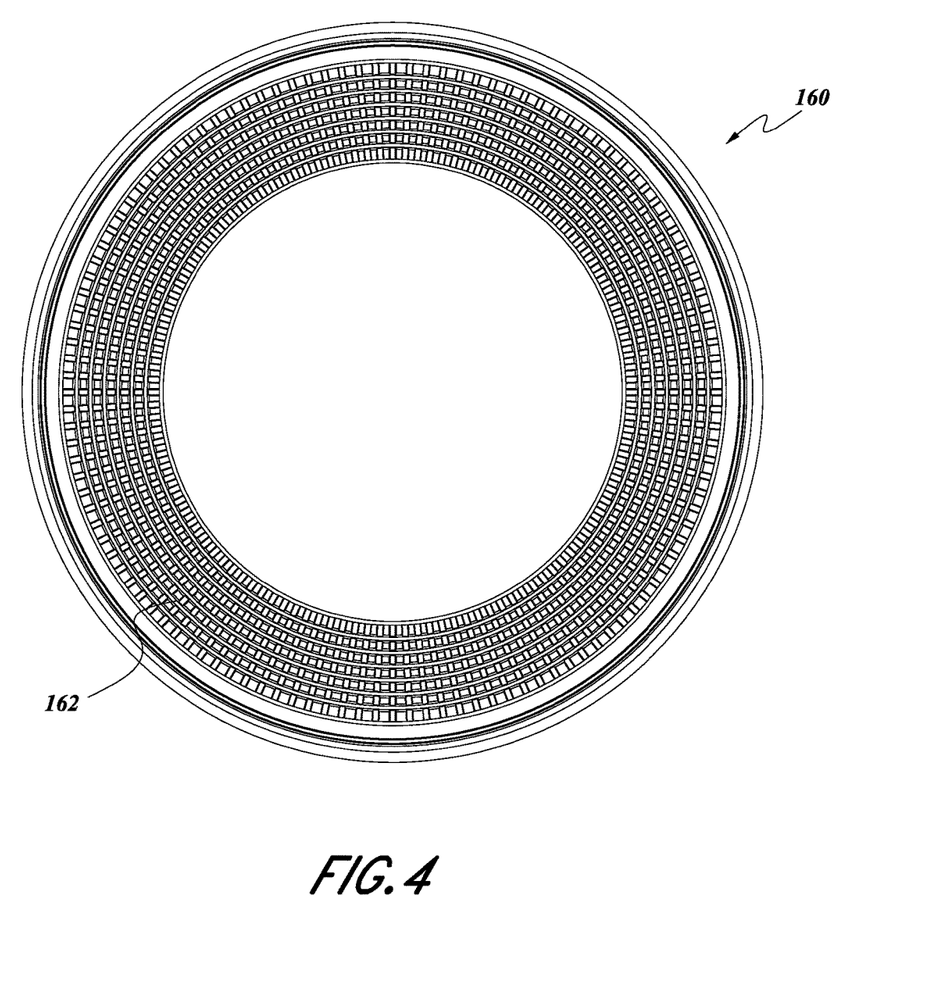
FIG. 4 is a top view of a divider of the device of FIG. 1.

In some configurations, a divider 160 can be positioned between the basket 120 and the lid 140. The divider 160 can be generally flat and circular in shape (or otherwise corresponding or complementary to the cross-sectional shape of the container 102). The divider 160 can be positioned about at a junction between the basket 120 and the lid 140. In some configurations, the divider 160 is received within the basket 120, such as generally at the upper rim 126. The taper of the basket 120 side wall 124 can support the divider 160 at a desired location determined by the size of the divider 160. The divider 160 can segment an interior space of the container 102 into an upper space above the divider 160 and a lower space below the divider 160. In some configurations, the water outlet openings 112 are only provided below the divider 160.

The divider 160 preferably comprises one or more openings or passages 162 that allow water to pass through the divider 160. In the illustrated arrangement, the openings 162 are defined by a perforated portion of the divider 160. Thus, the term perforated portion 162 is used herein to refer specifically to the illustrated arrangement, as well as more generally to openings or passages of any suitable type. In the illustrated arrangement, the perforated portion 162 is annular in shape and is defined by an annular depression or trough in the divider 160. The perforated portion 162 can be sized and positioned to be located above the annular space defined by the outer side wall 124 and the side wall 136 of the core 134. Thus, an inner diameter of the perforated portion 162 can be approximately equal to or greater than a diameter of a portion or an entirety of the core 134.

The neck 104 can be constructed from a single member of any desired height, usually depending on the desired depth below the ground surface that the container 102 will be placed. In some configurations, the neck 104 is constructed from multiple neck portions or neck segments 170, which can permit a length of the neck 104 to be easily configured or adjusted to suit the desired application. For example, the illustrated device 100 includes two neck segments 170 coupled together to form the neck 104. In other configurations, other numbers of neck segments 170 can be used, such as three, four, five or more segments 170. Neck segments 170 can be provided in various lengths, with the device 100 or in a separate kit, for example, to allow further adjustment of the length of the neck 104. In some configurations, one end of each neck segment 170 includes a male portion (male or external threaded portion) and one end includes a female portion (female or internal threaded portion) such that the neck segments 170 can be easily coupled end-to-end. Furthermore, the container 102 or lid 140 can have one of a male or female coupling and the cap 106 can have the other of a male or female coupling to allow easy connectivity of the container 102 (or lid 140), the neck 104 and the cap 106 regardless of the number of neck segments 170 employed.

As described above, the cap assembly 106 comprises the water inlet 108. The water inlet 108 can be defined by a tubular projection that extends in a perpendicular direction from the longitudinal axis of the neck 104. However, other suitable arrangements can also be used. A flow regulator 180 can control the flow of water from the water inlet 108 to the delivery conduit 110 of the neck 104. The flow regulator 180 can be of any suitable arrangement, such as a constant flow regulator or orifice valve, for example. In other configurations, the flow regulator 180 can be a needle/orifice valve, tapered valve, diaphragm valve, electronically-controlled valve or other suitable arrangement. For example, the flow regulator can include a first portion comprising a tapered passage and a second portion comprising a tapered valve body that is movable in an axial direction of the tapered passage to vary an effective area of the valve passage.

The cap 106 can comprise a tube or bubbler 182 and the water inlet 108 can supply water to a lower end of the bubbler 182, the water can rise within the bubbler 182 and spill over the top of the open upper end of the bubbler 182 and into the delivery conduit 110 of the neck 104. If desired, one or more filters 184 can be employed to filter the supplied water between the inlet 108 and the container 102. In some configurations, the filter(s) 184 are provided in the cap 106. For example, a first filter can filter water prior to the flow regulator and a second filter can filter water after the flow regulator relative to a flow path from the cap 106 to the container 102. The cap 106 can comprise a cover 186 that is coupled to a main body 188 of the cap 106. The main body 188 can define the water inlet 108 and bubbler 182. The cover 186 can be coupled to the main body 188 by any suitable arrangement, such as a threaded coupling, for example. In some configurations, the cover 186 is clear or opaque to allow the flow of water within the cap 106 to be visible from external of the cap 106. Accordingly, the flow of water can quickly and easily be observed from external of the device 100 without disassembly to allow for verification of proper operation.

In use, the container 102 of the device 100 can be filled with a granular material, such as volcanic basalt granules and charcoal, for example. In particular, the basket 120 can be filled with a granular material, the divider 160 positioned on the basket 120 and the lid 140 coupled to the basket 120. If not already completed, the one or more neck segments 170 can be assembled to one another and to the lid 140. If not already completed, the cap 106 can be assembled to the neck 104. If necessary, the cover 186 can be coupled to the main body 188 of the cap 106.

The device 100 can be buried in the ground at a desirable depth and at a desirable distance from the plant or tree. For example, the device 100 can be buried with the container 102 at a depth of about 10-120 cm. In some instances, the container 102 is buried at a depth of about 40 cm. In some configurations, the cap 106 remains above ground. In other configurations, the cap 106 can be buried and a conduit (e.g., tube) can extend underground to the cap 106. A source of water can be connected to the water inlet 108 and delivered to the device 100. In some applications, multiple devices 100 can be connected to a water supply system.

As a result of the above-described construction, in at least some configurations the device 100 distributes water in a generally radial direction from the container 102. Preferably, water is not distributed from the container 102 in an upward or downward direction. The water can be distributed along a height H of the container 102 (see FIG. 1), which can generally correspond to the perforated portion of the side wall 124.

Figure 5:
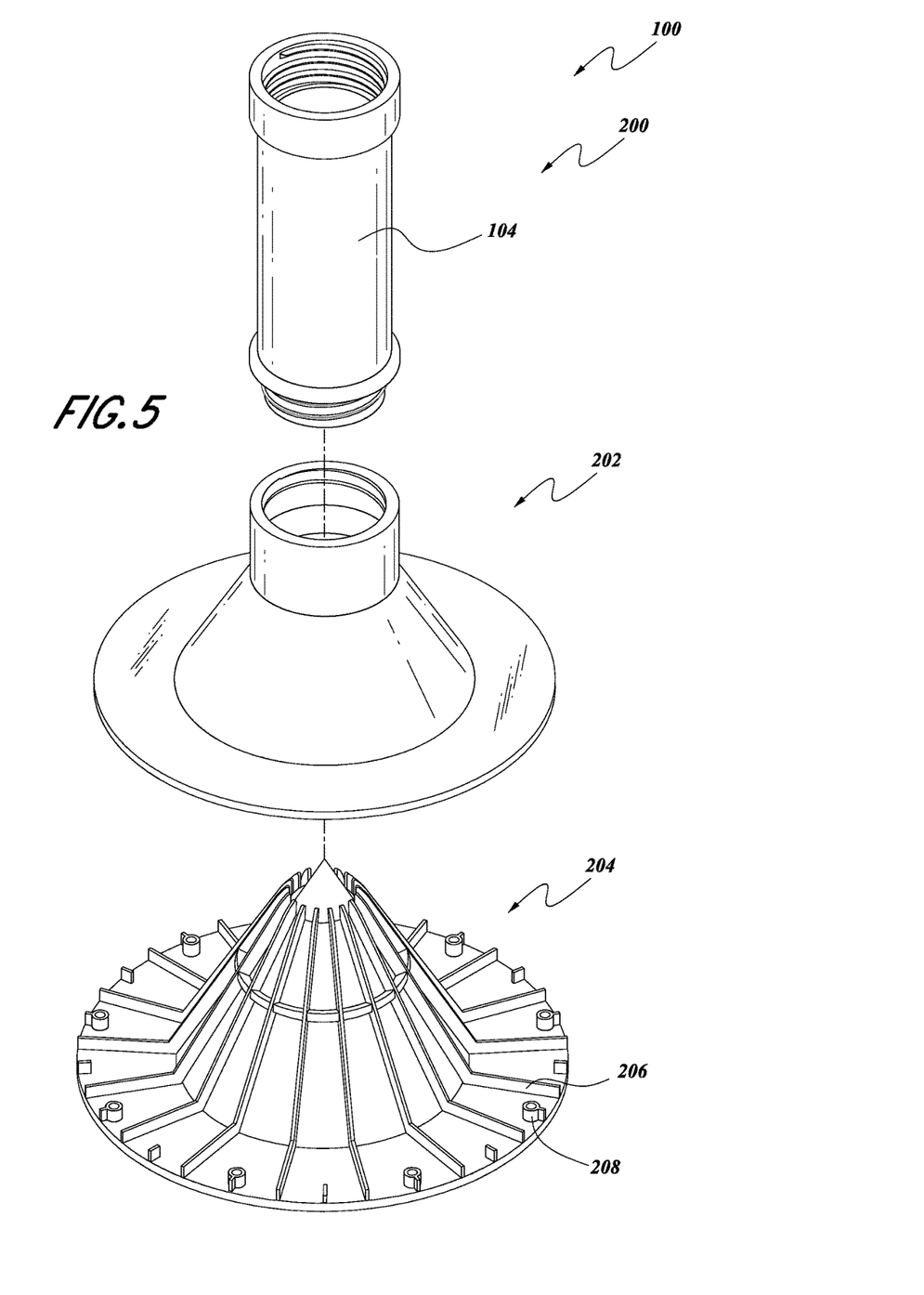
FIG. 5 is a perspective view of an alternative irrigation device in an exploded condition.

FIG. 5 illustrates another embodiment of an irrigation device 100, which is similar in construction and operation to the device 100 of FIGS. 1-4. In particular, the neck 104 and cap (not shown) of the device of FIG. 5 can be the same as or substantially similar to the neck 104 and cap 106 of the device 100 of FIGS. 1-4, or can be of another suitable arrangement. However, the container 102 is replaced with an alternative water distribution arrangement in the form of a cone 200. The cone 200 includes a first member 202 or outer or top member and a second member 204 or inner or bottom member. One of the members 202, 204 includes one or more stand-offs, such as ribs 206 and/or projections 208, which support the other of the members 202, 204 such that one or more spaces are defined between an inner or bottom surface of the first member 202 and an outer or top surface of the second member 204. In the illustrated arrangement, both ribs 206 and projections 208 are defined by an upper, outer or top surface of the second, inner or bottom member 204.

The use or operation of the device 100 of FIG. 5 can be substantially the same as or similar to the use or operation of the device 100 of FIGS. 1-4. Water is supplied to the device 100, such as to a water inlet in a cap. Water travels through the neck 104 to the water distribution cone 200, which is buried near the root of a tree or relatively large plant. Water travels in the space between the first member 202 and the second member 204 and can be guided by the ribs 206, if present. The device 100 of FIG. 5 can be useful for smaller trees or plants compared to the device 100 of FIGS. 1-4 due to the smaller height over which water is distributed.

Figure 6:
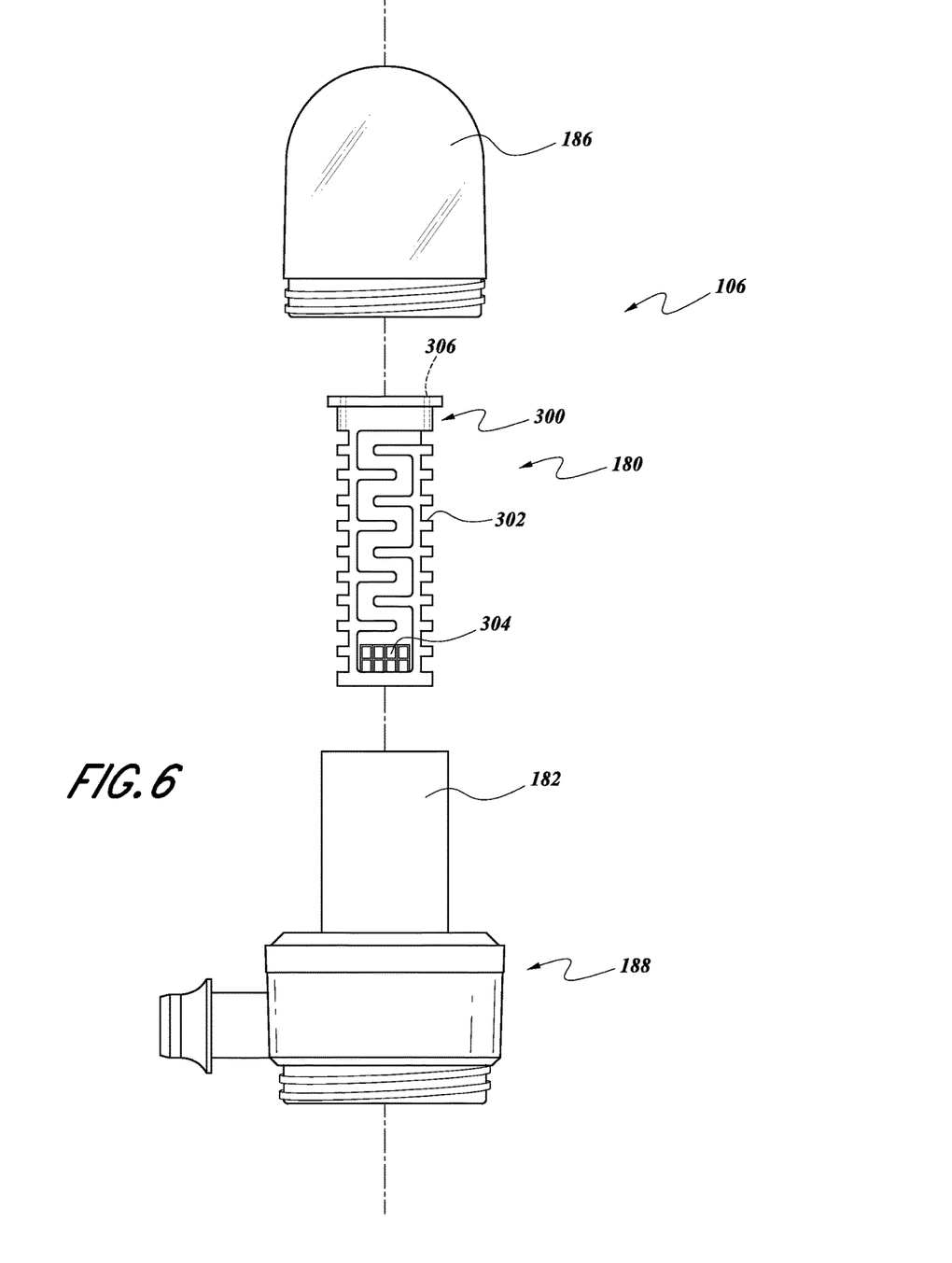
FIG. 6 is a side view of a flow regulator that can be used with the irrigation device of FIGS. 1-4 and the irrigation device of FIG. 5. The upper end of the illustrated irrigation device is shown in an exploded condition.

FIG. 6 illustrates an alternative cap assembly 106 that can be used with either of the device 100 of FIGS. 1-4 or the device 100 of FIG. 5. The cap 106 is substantially similar to the cap 106 described above with respect to FIGS. 1-5 with the exception of the flow regulator 180. The illustrated flow regulator 180 of FIG. 6 comprises a cylindrical valve body 300 that is received within the tube 182. The body 300 includes one or more channels that together with the tube 182 define one or more flow passages 302 of the flow regulator 180. A portion, such as a lower end, of the flow passages 302 communicates with the inlet 108 to receive water, which moves upwardly through the flow passages 302. An outlet communicates with an upper end portion of the flow passages 302 to allow water to exit the flow regulator 180 at or near an upper end of the tube 182. As described above, the water then flows through the neck 104 to the container 102.

The flow passages 302 of the illustrated body 300 comprise a series of curves connecting straight portions to define a tortuous pathway through which the water flows within the flow regulator 180. The straight portions extend in a circumferential direction of the body 300 in the illustrated arrangement. An inlet 304 to the flow passages 302 extends through a wall of the body 300 and communicates with an interior space of the body 300. Water from the inlet 108 passes into the interior space of the body 300, through the inlet 304 and into the flow passages 302. As described above, the water flows upwardly through the tortuous pathway defined by the flow passages 302 and exits the flow regulator 180 through an outlet 306 at or near an upper end portion of the tube 182. The tortuous pathway regulates the incoming flow of water. Any suitable number of flow passages 302 can be provided. In the illustrated arrangement, four flow passages 302 are provided and spaced circumferentially around the body 300. However, other arrangements can also be used.

Figure 7:
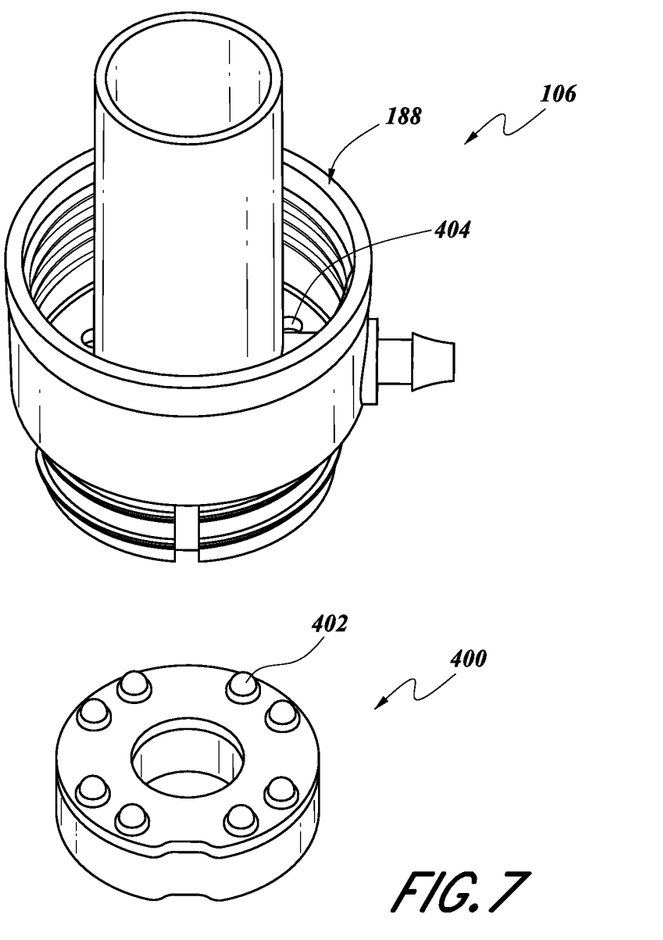
FIG. 7 is a perspective view of another cap assembly comprising a light module.
Figure 8:
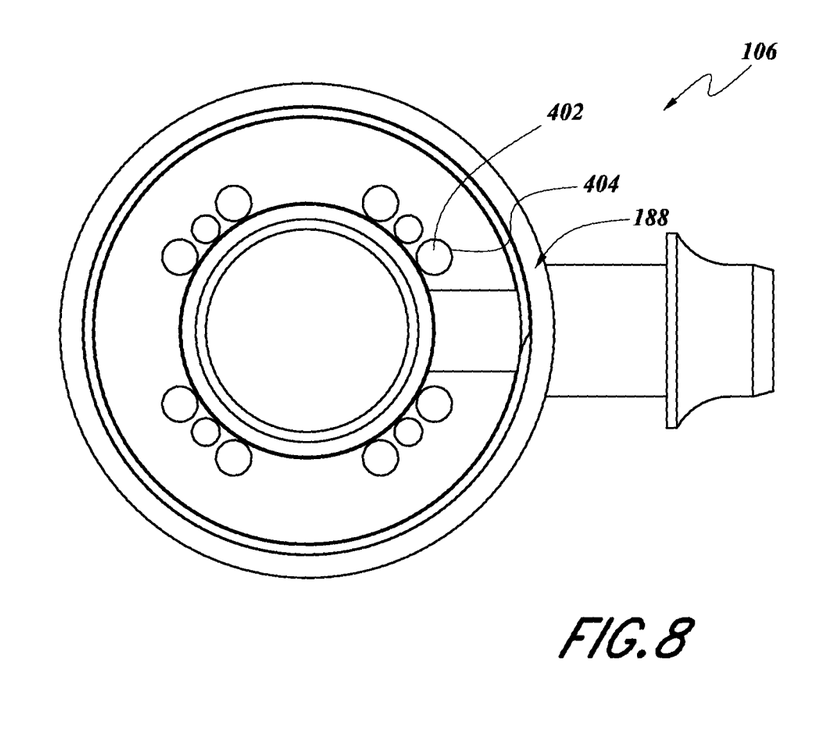
FIG. 8 is a top view of the cap assembly with light module of FIG. 7.

FIGS. 7 and 8 illustrate yet another cap assembly 106 that includes a light module 400 that illuminates the transparent or translucent cover 186 (see, for example, FIG. 6). The lighted cap assembly 106 can make the cap assembly 106 easy to see under low light conditions. The illustrated light module 400 includes one or more (e.g., eight) LED elements 402. The illustrated light module 400 can be annular in shape and can be received within the main body 188 of the cap assembly 106, which can include openings 404 through or into which the LED elements 402 can extend.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. An irrigation device, comprising:
    a container defining an interior space, the container comprising a basket and a lid, wherein the basket comprises a perforated side wall portion and a solid bottom wall portion, wherein the lid comprises a solid top wall portion, and wherein water is dispensed from the device through the perforated side wall portion;
    an elongated neck having a first end and a second end and defining a conduit therebetween, wherein the second end is coupled to the container and the neck extends upwardly from the container to the first end;
    a water inlet, wherein the water inlet communicates with the conduit of the neck at the first end;
    a plurality of ribs extending downwardly along an outer surface of the solid top wall portion and radially outwardly from the outer surface of the solid top wall portion;
    wherein the bottom wall portion of the container further comprises a solid core having a core top wall and a core side wall, wherein the core top wall, the core side wall, the bottom wall portion and the perforated side wall portion are integrally formed, wherein the core side wall extends upwardly from the bottom wall portion to a height greater than three-quarters of a height of the perforated side wall portion, wherein the core side wall is annular in shape, and an entirety of the core side wall within the interior space of the container is inwardly tapered, wherein the core side wall is spaced from and cooperates with the perforated side wall portion to define an annular cavity of the interior space of the container therebetween such that the annular cavity of the interior space extends all the way to a lower end of the container, and wherein the core top wall is spaced below an upper edge of the perforated side wall portion;
    wherein the solid top wall portion comprises a downwardly extending lip that extends circumferentially along a lower end of the solid top wall portion and engages the upper edge of the perforated side wall portion; and
    a divider positioned between the basket and the lid, wherein the divider comprises a perforated trough that is annular in shape and positioned above and in vertical alignment with the annular portion of the interior space of the container;
    wherein, in use, the container is buried underground and the water is delivered to the container through the water inlet and conduit of the neck.

2. The irrigation device of claim 1, wherein the lid of the basket extends radially outward from a widest portion of the elongated neck such that, once buried, soil above the lid applies a force to the container, tending to inhibit removal of the device from the soil in response to an upward force applied to the elongated neck.

3. The irrigation device of claim 1, wherein the perforated side wall portion is outwardly tapered in a direction from a bottom to a top of the container.

4. The irrigation device of claim 1, wherein the neck comprises multiple neck segments that are connectable to one another.

5. The irrigation device of claim 1, further comprising a cap that is attached to the first end of the neck, wherein the cap defines the water inlet.

6. The irrigation device of claim 1, further comprising a flow regulator in the cap.

7. The irrigation device of claim 6, wherein the flow regulator is adjustable up to 300 liters/hour.

8. The irrigation device of claim 6, wherein the flow regulator comprises at least one tortuous pathway through which water moves within the flow regulator.

9. The irrigation device of claim 1, wherein the container is between 15-50 cm in height and between 15-50 cm in width.

10. The irrigation device of claim 9, wherein the container is generally spherical in outer shape.

11. The irrigation device of claim 1, further comprising a granular material within the container.

* * * * *